US012522475B2

(12) United States Patent
Hino et al.

(10) Patent No.: US 12,522,475 B2
(45) Date of Patent: Jan. 13, 2026

(54) CONSTRUCTION ELEVATOR DEVICE

(71) Applicant: Hitachi, Ltd., Tokyo (JP)

(72) Inventors: Yuto Hino, Tokyo (JP); Akitomo Igarashi, Tokyo (JP); Takayuki Hagiwara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 666 days.

(21) Appl. No.: 17/911,928

(22) PCT Filed: Mar. 16, 2020

(86) PCT No.: PCT/JP2020/011371
§ 371 (c)(1),
(2) Date: Sep. 15, 2022

(87) PCT Pub. No.: WO2021/186493
PCT Pub. Date: Sep. 23, 2021

(65) Prior Publication Data

US 2023/0174346 A1 Jun. 8, 2023

(51) Int. Cl.
*B66B 11/00* (2006.01)
*B66B 7/02* (2006.01)
(Continued)

(52) U.S. Cl.
CPC ................ *B66B 19/00* (2013.01); *B66B 7/02* (2013.01); *B66B 11/0045* (2013.01); *E04G 3/32* (2013.01); *E04G 2003/283* (2013.01)

(58) Field of Classification Search
CPC ....... B66B 19/00; B66B 7/02; B66B 11/0045; E04G 3/32; E04G 2003/283
(Continued)

(56) References Cited

U.S. PATENT DOCUMENTS 7,267,240 B2 * 9/2007 Maurer ................. B66C 13/063 212/270
8,584,803 B2 * 11/2013 Sani .......................... E04G 3/30 182/112
9,546,076 B2 * 1/2017 Mikkonen ............... B66B 7/021
9,751,728 B2 * 9/2017 Mertala ................... E04G 3/246
(Continued)

FOREIGN PATENT DOCUMENTS

EP 2 284 113 A2 2/2011
FR 2 694 279 A1 2/1994
(Continued)

OTHER PUBLICATIONS

International Search Report (PCT/ISA/210) issued in PCT Application No. PCT/JP2020/011371 dated May 26, 2020 with English translation (five (5) pages).
(Continued)

*Primary Examiner* — Brian E Glessner
(74) *Attorney, Agent, or Firm* — Crowell & Moring LLP

(57) ABSTRACT

The present invention includes machine room unit hoisters 9*a,* 9*b,* 9*c* by which a machine room unit 6 is suspended from a support member provided in a hoistway so as to be movable in an ascending/descending direction. The machine room unit hoisters 9*a,* 9*b,* 9*c* suspend the machine room unit 6 at suspension points 21*a,* 21*b,* 21*c*. The machine room unit hoisters 9*a,* 9*b,* 9*c* are provided, supported by the support member. When viewed from a virtual horizontal plane over the machine room unit 6, distances from a center G of gravity of the machine room unit 6 to each of the suspension points are substantially equal and the center G of gravity is positioned within a region enclosed by virtual straight lines connecting each of the suspension points 21*a,* 21*b,* 21*c*. When viewed from a virtual horizontal plane over a working platform 5, the respective suspension points 21*a,* 21*b,* 21*c* of the machine room unit 6 are positioned outside a contour of the working platform 5.

7 Claims, 6 Drawing Sheets

(51) Int. Cl.

| | |
|---|---|
| ***B66B 19/00*** | (2006.01) |
| ***E04G 3/32*** | (2006.01) |
| *E04G 3/28* | (2006.01) |

(58) Field of Classification Search

USPC .......................................................... 182/129

See application file for complete search history.

(56) References Cited

U.S. PATENT DOCUMENTS

| | | | | |
|---|---|---|---|---|
| 10,766,744 | B2 * | 9/2020 | Hägg | B66B 19/00 |
| 11,554,934 | B1 * | 1/2023 | Chiavarelli | B66B 5/0018 |
| 2011/0113720 | A1 * | 5/2011 | Peacock | B66B 19/00<br>187/254 |
| 2013/0118838 | A1 | 5/2013 | Plathin | |
| 2016/0251863 | A1 * | 9/2016 | Cao | B66C 13/04<br>182/19 |
| 2017/0327348 | A1 | 11/2017 | Blaesi | |
| 2017/0362063 | A1 * | 12/2017 | Watson | B66B 9/00 |
| 2018/0273349 | A1 * | 9/2018 | Weibel | B66B 7/024 |
| 2021/0316959 | A1 * | 10/2021 | Fridmann | B66B 9/187 |

FOREIGN PATENT DOCUMENTS

| | | | |
|---|---|---|---|
| JP | 5-262475 | A | 10/1993 |
| JP | 7-33355 | A | 2/1995 |
| JP | 2000-72343 | A | 3/2000 |
| JP | 2013-532104 | A | 8/2013 |
| JP | 2013-220859 | A | 10/2013 |
| WO | WO 2010/100319 | A1 | 9/2010 |
| WO | WO 2016/096694 | A1 | 6/2016 |

OTHER PUBLICATIONS

Japanese-language Written Opinion (PCT/ISA/237) issued in PCT Application No. PCT/JP2020/011371 dated May 26, 2020 (three (3) pages).

Extended European Search Report issued in European Application No. 20926260.9 dated Nov. 22, 2023 (7 pages).

Chinese-language Office Action issued in Chinese Application No. 202080095105.3 dated Apr. 10, 2023 with partial English translation (10 pages).

* cited by examiner

CONSTRUCTION ELEVATOR DEVICE

TECHNICAL FIELD

The present invention relates to a construction elevator device.

BACKGROUND ART

Construction elevator devices are conventionally used to hoist materials and others in construction work sites. Then, a construction elevator device is described in, e.g., Patent Literature (PTL) 1. The construction elevator device described in PTL 1 is equipped with two hoisters provided over a machine room unit, supported by a support structure in a top portion of a hoistway, and the two hoisters hoist the machine room unit.

Another example of a construction elevator device is described in, e.g., PTL 2. The construction elevator device described in PTL 2 is equipped with one hoister provided over a machine room unit. This hoister hoists the machine room unit by 1:X roping through a plurality of pulleys provided onto the machine room unit and a support structure respectively.

CITATION LIST

Patent Literature

PTL 1: International Publication WO No. 2016/096694
PTL 2: International Publication WO No. 2010/100319

SUMMARY OF INVENTION

Technical Problem

However, the construction elevator device described in PTL 1 hoists the machine room unit suspended at two points and, therefore, it has been difficult to maintain stability of the machine room unit. In addition, the construction elevator device described in PTL 2 performs 1:X roping that requires a rope (suspension rope) arrangement over a wide range between the machine room unit and the support structure. Therefore, it is difficult to place a working carrier between the machine room unit and the support structure and the working carrier is placed on the top of the support structure. Also, it is difficult to arrange a plurality of pulleys necessary for 1:X roping in desired positions on the machine room unit and it is difficult to keep the machine room unit balanced in a stable state.

An object of the present invention is to solve the above-noted problems of prior art and provide a construction elevator device that avoids interference between machine room hoisters and a working platform and makes it possible to maintain stability of a machine room unit.

Solution to Problem

To achieve the foregoing object, a construction elevator device includes a support member provided in a hoistway, a machine room unit placed under the support member, and machine room unit hoisters by which the machine room unit is suspended from the support member so as to be movable in an ascending/descending direction.

The machine room unit hoisters being at least three in number are provided, supported by the support member, and there are at least three suspension points of the machine room unit. When viewed from a virtual horizontal plane over the machine room unit, distances from a center of gravity of the machine room unit to each of the suspension points are substantially equal and the center of gravity is positioned within a region enclosed by virtual straight lines connecting each of the suspension points.

Advantageous Effects of Invention

According to the construction elevator device configured as above, interference of the working platform with the machine room unit hoisters is avoided and stability of the machine room unit can be maintained.

In addition, according to the thus configured construction elevator device, the machine room unit hoisters are installed onto the support member and, therefore, it is possible to reduce the weight of the machine room unit by leaving the weights of the machine room unit hoisters out of account. In consequence, it is possible to lessen the driving force for the machine room unit hoisters to pull up the machine room unit and it is possible to prevent an increase in size of the machine room unit hoisters.

DESCRIPTION OF EMBODIMENTS

In the following, examples of a construction elevator device of the present invention will be described with reference to FIGS. 1 through 5.

Example 1

[Structure of a Construction Elevator Device]

Figure 1:
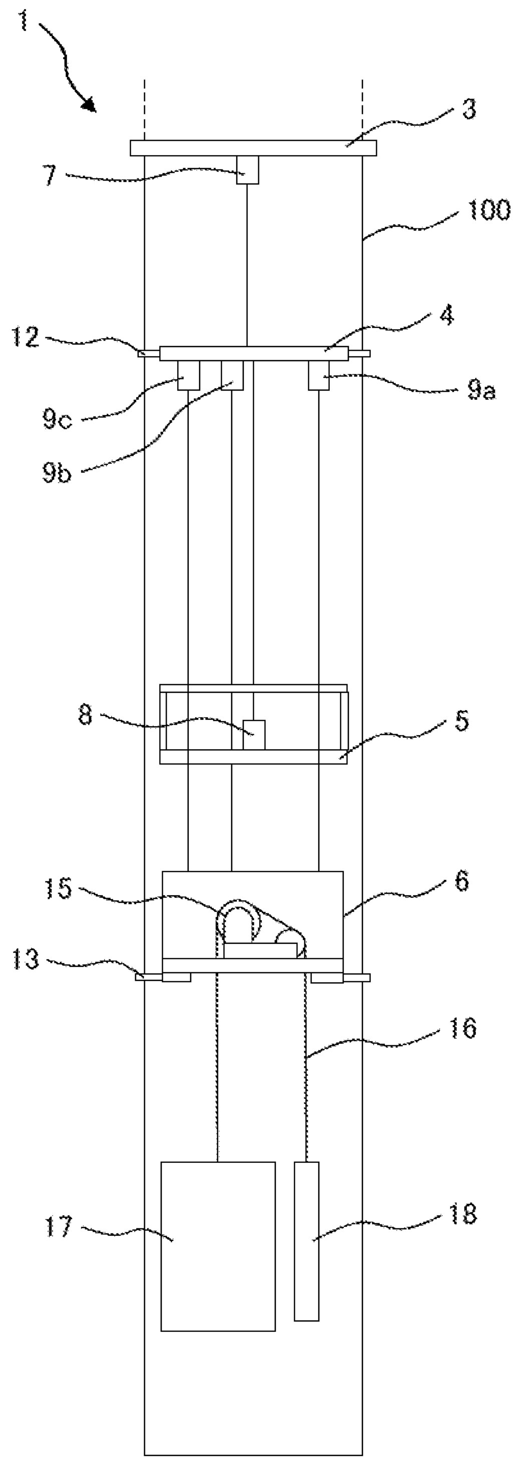
FIG. 1 is a schematic structural diagram of a construction elevator device relevant to Example 1 of the present invention.
Figure 2:
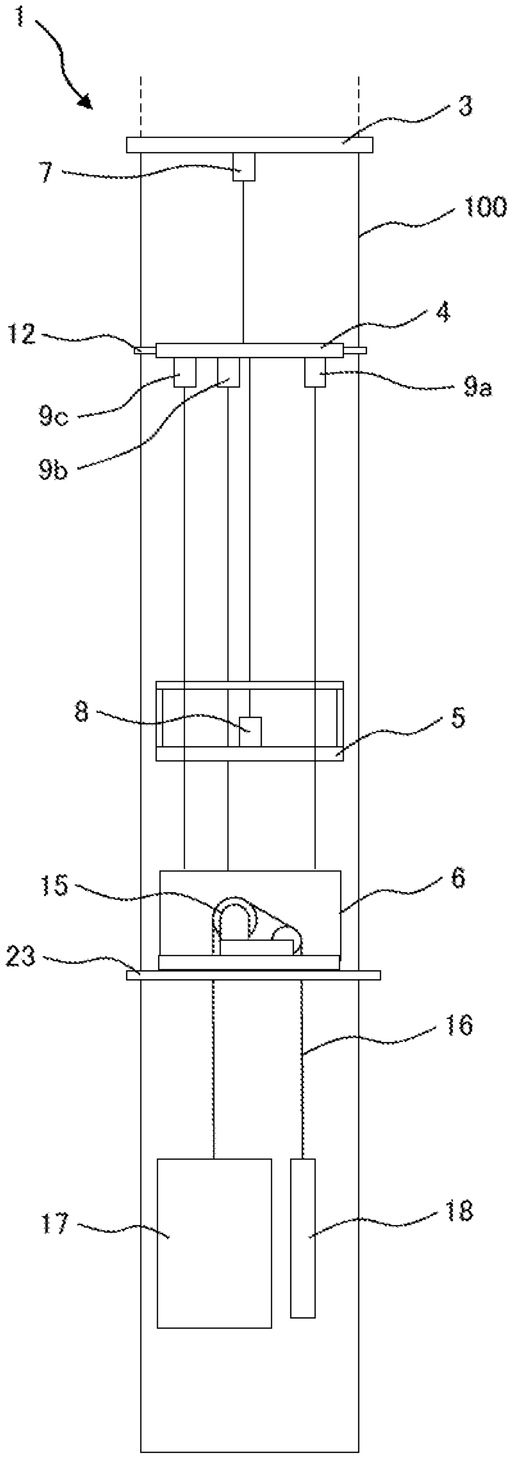
FIG. 2 is a schematic structural diagram of a construction elevator device relevant to another example of Example 1 of the present invention.

First, a description is provided about the structure of a construction elevator device relevant to Example 1 of the present invention with reference to FIG. 1. FIG. 1 is a schematic structural diagram of the construction elevator device relevant to Example 1. FIG. 2 is a schematic structural diagram of a construction elevator device relevant to another example of Example 1.

As depicted in FIG. 1, the construction elevator device 1 relevant to Example 1 is provided inside a hoistway 100 formed in a building structure. This construction elevator device 1 includes a first support member 3, a second support member 4, a working platform 5, a machine room unit 6, a second support member hoister 7, a working platform hoister 8, and machine room unit hoisters 9*a*, 9*b*, 9*c*. The machine room unit hoisters 9*a*, 9*b*, 9*c* being at least three in number are provided, supported by the second support member 4.

The first support member 3 is located uppermost inside the hoistway 100 and fixed to beams (not depicted) of the building. The second support member 4 has movable support portions 12 that stretch toward wall surfaces of the hoistway 100 and retract (in a horizontal direction in FIG. 1) and engage with beams of the building when in a fully stretched state and is configured to be movable in an ascending/descending direction. This second support member 4 is suspended from the first support member 3 by the second support member hoister 7 installed onto the first support member 3.

When moving the second support member 4 from a building floor where it stays now to an upper floor of the building, the second support member 4 is pulled up by the second support member hoister 7 with the movable support portions 12 retracted and, once the second support member 4 has passed the beams of the upper floor of the building, the movable support portions 12 are stretched to engage with the beams of the upper floor of the building. Thus, equipping the second support member 4 with the movable support portions 12 makes it possible to improve the workability of moving the second support member 4 up and down.

The working platform 5 is suspended from the second support member 4 by the working platform hoister 8 installed onto the working platform 5 and configured to be movable in an ascending/descending direction. The machine room unit 6 is suspended from the second support member 4 by the machine room unit hoisters 9*a*, 9*b*, 9*c* installed onto the second support member 4 and configured to be movable in an ascending/descending direction.

The machine room unit 6 has movable support portions 13 that stretch toward wall surfaces of the hoistway 100 and retract (in a horizontal direction in FIG. 1) and engage with beams of the building when in a fully stretched state. The machine room unit 6 also has a winch 15, a main rope 16 wound around the sheave of the winch 15, a car 17 connected to one end of the main rope 16, and a counterweight 18 connected to the other end of the main rope 16.

The winch 15 winds up the main rope 16 to move the car 17 up and down. When moving the machine room unit 6 from a building floor where it stays now to an upper floor of the building, the machine room unit 6 is pulled up by the machine room unit hoisters 9*a*, 9*b*, 9*c* with the movable support portions 13 retracted and, once the machine room unit 6 has passed the beams of the upper floor of the building, the movable support portions 13 are stretched to engage with the beams of the upper floor of the building. Thus, equipping the machine room unit 6 with the movable support portions 13 makes it possible to improve the workability of moving the machine room unit 6 up and down.

Note that, although the structure depicted in FIG. 1 is configured such that the machine room unit 6 is equipped with the movable support portions 13 that are stretchable and retractable, the present invention is not limited to this structure. For example, as depicted in FIG. 2, the machine room unit 6 may be equipped with a machine room support unit 23 fixed to it.

The construction elevator device 1 configured as above operates the car 17 (the counterweight 18) of the machine room unit 6 in an ascending/descending direction and carries, e.g., workers in a construction site to lower floors under the machine room unit 6. Additionally, workers for installation of the elevator device get in the working platform 5 of the construction elevator device 1 and they install car's guide rails, counterweight side guide rails, in-tower equipment, etc. in the hoistway 100 while operating the working platform hoister 8.

[Positions of Suspension Points of the Machine Room Unit]

Figure 3:
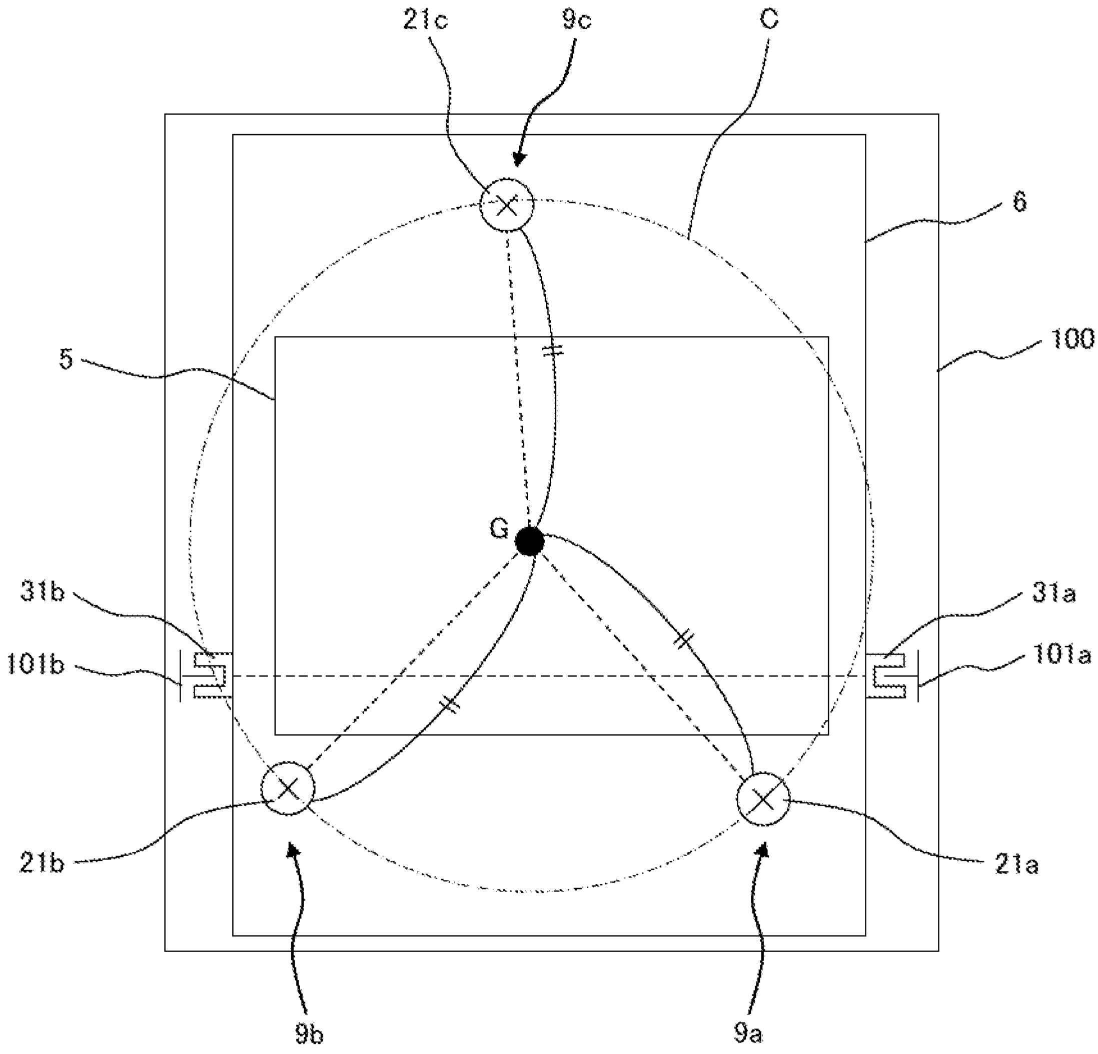
FIG. 3 is a plan view representing a positional relationship among machine room unit hoisters, a machine room unit, and a working platform in the construction elevator device relevant to Example 1 of the present invention.

Next, with reference to FIG. 3, a description is provided about the positions of suspension points at which the machine room unit 6 is suspended by the machine room unit hoisters 9*a*, 9*b*, 9*c*. FIG. 3 is a plan view representing a positional relationship among the machine room unit hoisters, the machine room unit, and the working platform in the construction elevator device relevant to Example 1.

As described previously, the machine room unit 6 is suspended from the second support member 4 by the machine room unit hoisters 9*a*, 9*b*, 9*c* installed onto the second support member 4 (see FIG. 1 and FIG. 2). In addition, the working platform 5 is placed between the second support member 4 and the machine room unit 6 inside the hoistway 100. As depicted in FIG. 3, there are three suspension points at which the machine room unit 6 is suspended by the machine room unit hoisters 9*a*, 9*b*, 9*c* and they are designated as suspension points 21*a*, 21*b*, 21*c*.

The suspension points 21*a*, 21*b*, 21*c* are drawn on a virtual horizontal plane centering on the center G of gravity of the machine room unit 6 and placed in positions on a virtual circle C around outside the contour of the working platform 5. According to this drawing, when viewed from the virtual horizontal plane over the machine room unit 6, the distances from the center G of gravity of the machine room unit 6 to the suspension points 21*a*, 21*b*, 21*c* at which the machine room unit is suspended by the machine room unit hoisters 9*a*, 9*b*, 9*c* are substantially equal.

In addition, the center G of gravity of the machine room unit 6 is positioned within a region enclosed by virtual straight lines connecting each of the suspension points 21*a*, 21*b*, 21*c*. Moreover, when viewed from the virtual horizontal plane over the working platform 5, the respective suspension points 21*a*, 21*b*, 21*c* are positioned outside the counter of the working platform 5.

In consequence, even when the working platform 5 is moved up and down, the working platform 5 can be prevented from interfering with the ropes (suspension ropes) of the machine room unit hoisters 9*a*, 9*b*, 9*c* and the suspension points 21*a*, 21*b*, 21*c*. Therefore, hoisting the machine room unit 6 can be performed without carrying the working platform 5 out of the hoistway 100.

In addition, because load is evenly applied to the suspension points 21*a*, 21*b*, 21*c* of the machine room unit 6, it is possible to effectively prevent the machine room unit 6 from tilting and stability of the machine room unit 6 can be maintained. Furthermore, it is possible to hoist the machine room unit 6 while preventing an overload to one of the machine room unit hoisters.

Furthermore, because the machine room unit hoisters 9*a*, 9*b*, 9*c* that hoist the machine room unit 6 are installed onto the second support member 4, it is possible to reduce the weight of the machine room unit 6 by leaving the weights of the machine room unit hoisters 9*a*, 9*b*, 9*c* out of account. In consequence, it is possible to lessen the driving force for the machine room unit hoisters 9*a*, 9*b*, 9*c* to pull up the car 17, the counterweight 18, and the machine room unit 6 and it is possible to prevent an increase in size of the machine room unit hoisters 9*a*, 9*b*, 9*c*.

Note that the center G of gravity of the machine room unit 6 varies depending on hoistway dimensions and machine (winch) installation position specific to an elevator device that is intended for use. Therefore, the suspension points 21$a$, 21$b$, 21$c$ in the construction elevator device of the present example should be determined according to the center G of gravity of the machine room unit 6.

Example 2

[Positions of Suspension Points of the Machine Room Unit]

Figure 4:
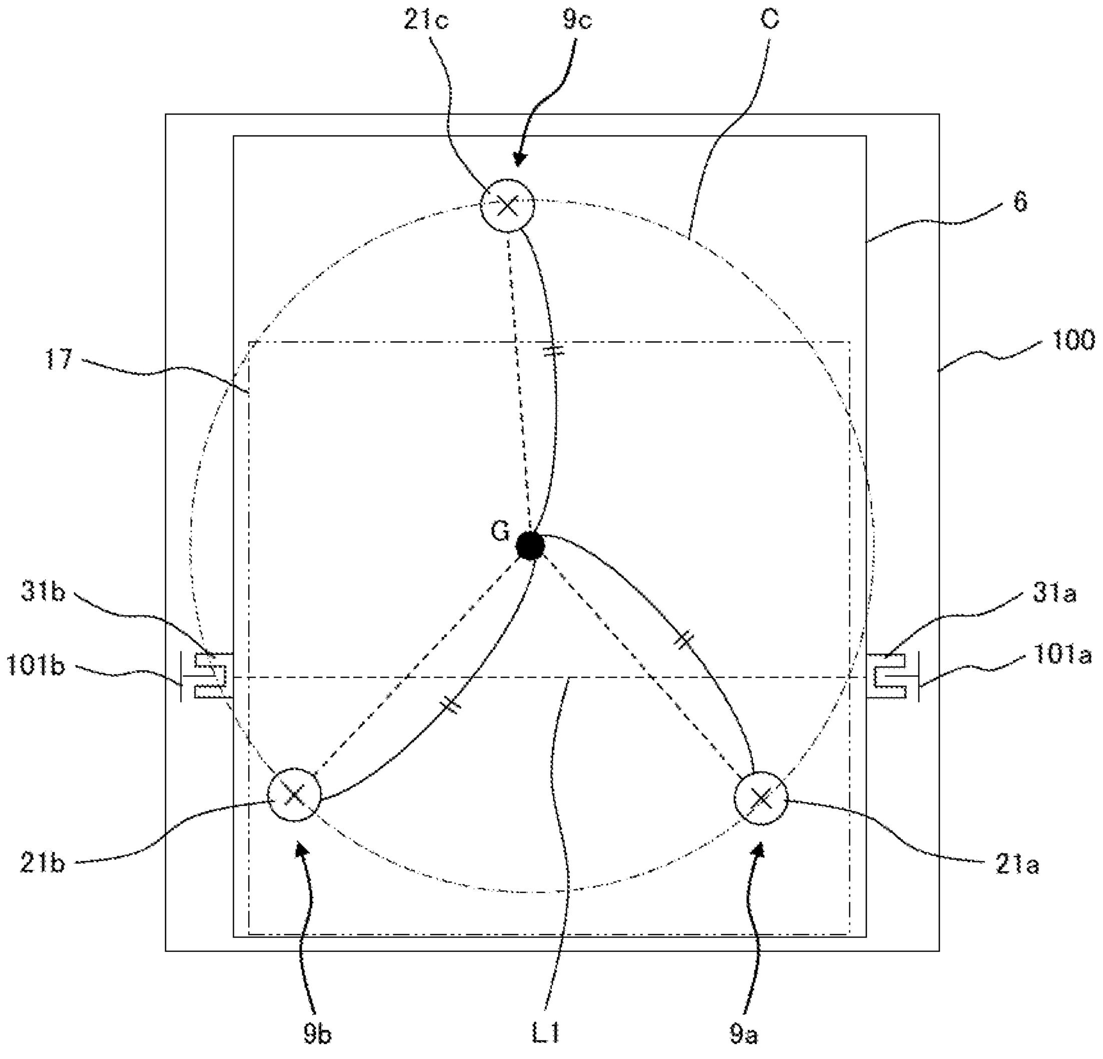
FIG. 4 is a plan view representing a positional relationship among machine room unit hoisters, a machine room unit, and a car in a construction elevator device relevant to Example 2 of the present invention.

A description is provided below about a construction elevator device relevant to Example 2 of the present invention with reference to FIG. 4. FIG. 4 is a plan view representing a positional relationship among the machine room unit hoisters, the machine room unit, and the car in the construction elevator device relevant to Example 2.

The construction elevator device relevant to Example 2 has the same structure as of the construction elevator device relevant to the foregoing Example 1 and a difference lies in the positions of the suspension points at which the machine room unit 6 is suspended by the machine room unit hoisters 9$a$, 9$b$, 9$c$. Hence, a description is provided here about the positions of the suspension points of the machine room unit 6 concerned in Example 2 and descriptions about components that are common with Example 1 are omitted.

As described previously, the car 17 is placed under the machine room unit 6 (see FIG. 1 and FIG. 2). Also, as in FIG. 4, a pair of car's guide rails 101$a$, 101$b$ to guide the car 17 in an ascending/descending direction is provided in the hoistway 100. The pair of car's guide rails 101$a$, 101$b$ extends along wall surfaces facing each other in the hoistway 100.

On the other hand, the car 17 is provided with a pair of car's guide shoes (not depicted) that slidably engages with the pair of car's guide rails 101$a$, 101$b$. In addition, the machine room unit 6 is provided with a pair of machine room's guide shoes 31$a$, 31$b$ that slidably engages with the pair of car's guide rails 101$a$, 101$b$. Therefore, the pair of car's guide rails 101$a$, 101$b$ guides the machine room unit 6 in an ascending/descending direction.

The positions of the suspension points of the machine room unit 6 concerned in Example 2 fulfill all the conditions for the positions of the suspension points of the machine room unit 6 concerned in Example 1. Therefore, even in the construction elevator device relevant to Example 2, the working platform 5 can be prevented from interfering with the ropes (suspension ropes) of the machine room unit hoisters 9$a$, 9$b$, 9$c$ and the suspension points 21$a$, 21$b$, 21$c$, as is the case for Example 1. In addition, it is possible to effectively prevent the machine room unit 6 from tilting and stability of the machine room unit 6 can be maintained. It is possible to prevent an overload to one of the machine room unit hoisters.

Furthermore, in Example 2, among the suspension points 21$a$, 21$b$, 21$c$ of the machine room unit 6, the suspension points 21$a$ and 21$b$ are placed opposite to the center G of gravity of the machine room unit 6 across a car's virtual straight line L1 connecting the pair of car's guide rails 101$a$, 101$b$. Thereby, the suspension points 21$a$ and 21$b$ are not only placed outside the contour of the working platform 5 but also placed outward of and opposite to the center G of gravity with respect to the car's virtual straight line L1. In consequence, even if an unbalanced load occurs in the machine room unit 6, it is possible to prevent an overload from being exerted on the car's guide rails 101$a$, 101$b$.

Note that the center G of gravity of the machine room unit 6 varies depending on hoistway dimensions and machine (winch) installation position specific to an elevator device that is intended for use. Also, positions where the pair of car's guide rails 101$a$, 101$b$ is installed vary depending on an elevator device that is intended for use. Therefore, the suspension points 21$a$, 21$b$, 21$c$ in the construction elevator device of the present example should be determined according to the center G of gravity of the machine room unit 6 and the positions of the pair of car's guide rails 101$a$, 101$b$.

Example 3

[Positions of Suspension Points of the Machine Room Unit]

Figure 5:
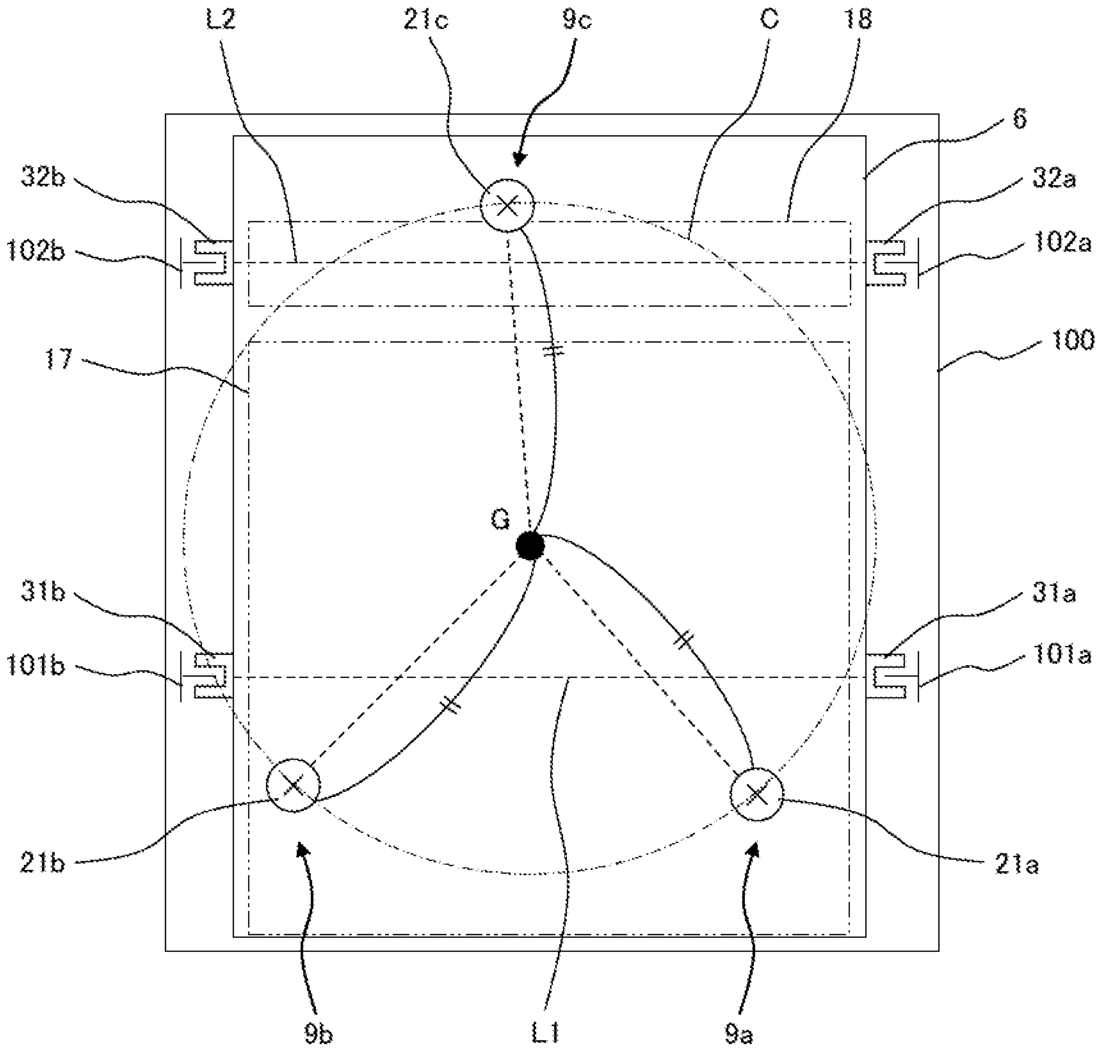
FIG. 5 is a plan view representing a positional relationship among machine room unit hoisters, a machine room unit, a car, and a counterweight in a construction elevator device relevant to Example 3 of the present invention.

A description is provided below about a construction elevator device relevant to Example 3 of the present invention with reference to FIG. 5. FIG. 5 is a plan view representing a positional relationship among the machine room unit hoisters, the machine room unit, the car, and the counterweight in the construction elevator device relevant to Example 3.

The construction elevator device relevant to Example 3 has the same structure as of the construction elevator device relevant to the foregoing Example 2 and a difference lies in the positions of the suspension points at which the machine room unit 6 is suspended by the machine room unit hoisters 9$a$, 9$b$, 9$c$. Hence, a description is provided here about the positions of the suspension points of the machine room unit 6 concerned in Example 2 and descriptions about components that are common with Example 2 are omitted.

The counterweight 18 is placed under the machine room unit 6 (see FIG. 1 and FIG. 2). As depicted in FIG. 5, a pair of weight's guide rails 102$a$, 102$b$ to guide the counterweight 18 in an ascending/descending direction is provided in the hoistway 100. The pair of weight's guide rails 102$a$, 102$b$ extends along wall surfaces facing each other in the hoistway 100.

A weight's virtual straight line L2 connecting the pair of weight's guide rails 102$a$, 102$b$ is substantially parallel with the car's virtual straight line L1 connecting the pair of car's guide rails 101$a$, 101$b$. That is to say, the pair of weight's guide rails 102$a$, 102$b$ and the pair of car's guide rails 101$a$, 101$b$ are provided on a couple of wall surfaces facing each other in the hoistway 100.

The counterweight 18 is provided with a pair of weight's guide shoes (not depicted) that slidably engages with the pair of weight's guide rails 102$a$, 102$b$. In addition, the machine room unit 6 is provided with a pair of machine room's guide shoes 32$a$, 32$b$ that slidably engages with the pair of weight's guide rails 102$a$, 102$b$. Therefore, the pair of weight's guide rails 102$a$, 102$b$ guides the machine room unit 6 in an ascending/descending direction.

The positions of the suspension points of the machine room unit 6 concerned in Example 3 fulfill all the conditions for the positions of the suspension points of the machine room unit 6 concerned in Example 2. Therefore, even in the construction elevator device relevant to Example 3, the working platform 5 can be prevented from interfering with the ropes (suspension ropes) of the machine room unit hoisters 9$a$, 9$b$, 9$c$ and the suspension points 21$a$, 21$b$, 21$c$, as is the case for Example 2.

In addition, it is possible to effectively prevent the machine room unit 6 from tilting and stability of the machine room unit 6 can be maintained. It is possible to prevent an overload to one of the machine room unit hoisters. Even if an unbalanced load occurs in the machine room unit 6, it is possible to prevent an overload from being exerted on the car's guide rails 101$a$, 101$b$.

Furthermore, in Example 3, among the suspension points 21$a$, 21$b$, 21$c$ of the machine room unit 6, the suspension point 21*c* is placed opposite to the center G of gravity of the machine room unit 6 across the weight's virtual straight line L2. Thereby, the suspension point 21*c* is not only placed outside the contour of the working platform 5 but also placed outward of and opposite to the center G of gravity with respect to the weight's virtual straight line L2. In consequence, even if an unbalanced load occurs in the machine room unit 6, it is possible to prevent an overload from being exerted on the pair of weight's guide rails 102*a*, 102*b*.

Note that the center G of gravity of the machine room unit 6 varies depending on hoistway dimensions and machine (winch) installation position specific to an elevator device that is intended for use. Also, positions where the pair of car's guide rails 101*a*, 101*b* and the pair of weight's guide rails 102*a*, 102*b* are installed vary depending on an elevator device that is intended for use. Hence, the suspension points 21*a*, 21*b*, 21*c* in the construction elevator device of the present example should be determined according to the center G of gravity of the machine room unit 6 and the positions of the respective guide rails.

Example 4

[Structure of a Construction Elevator Device]

Figure 6:
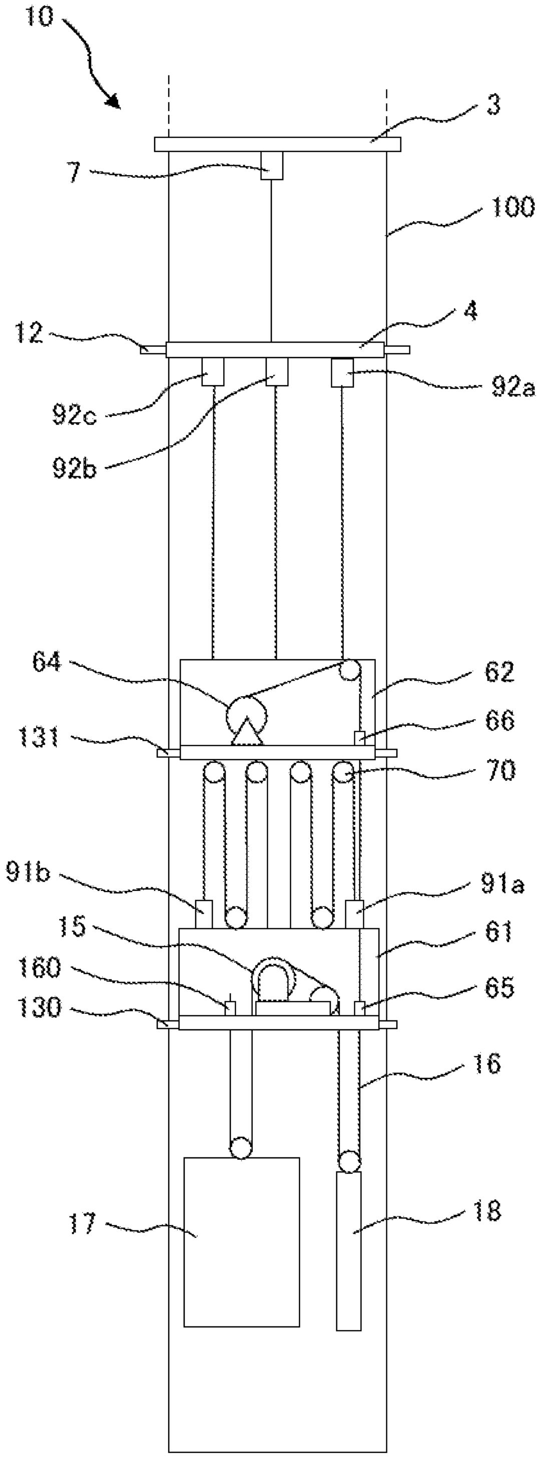
FIG. 6 is a schematic structural diagram of a construction elevator device relevant to Example 4 of the present invention.

A description is provided below about a construction elevator device relevant to Example 4 of the present invention with reference to FIG. 6. FIG. 6 is a schematic structural diagram of the construction elevator device relevant to Example 4.

The construction elevator device relevant to Example 4 is configured such that the working platform 5 is removed and the machine room unit is divided into multiple ones, which differs from the construction elevator devices relevant to Examples 1 through 3. In Example 4, the machine room unit is comprised of a first machine room unit and a second machine room unit.

As depicted in FIG. 6, the construction elevator device 10 relevant to Example 4 is provided inside a hoistway 100 formed in a building structure. This construction elevator device 10 includes a first support member 3, a second support member 4, a first machine room unit 61, a second machine room unit 62, a second support member hoister 7, first machine room unit hoisters 91*a*, 91*b*, and second machine room hoisters 92*a*, 92*b*, 92*c*. The second machine room hoisters 92*a*, 92*b*, 92*c* being at least three in number are provided, supported by the second support member 4 and pull up the second machine room unit 62.

Note that, although the structure depicted in FIG. 6 is configured such that the first machine room unit 61 is equipped with two first machine room unit hoisters 91*a*, 91*b*, the present invention is not limited to this structure. For example, it may be configured such that the first machine room unit is equipped with at least one first machine room unit hoister.

The first support member 3 is located uppermost inside the hoistway 100 and fixed to beams of the building. The second support member 4 has movable support portions 12 that stretch toward wall surfaces of the hoistway 100 and retract (in a horizontal direction in FIG. 6) and engage with beams of the building when in a fully stretched state and is configured to be movable in an ascending/descending direction. This second support member 4 is suspended from the first support member 3 by the second support member hoister 7 installed onto the first support member 3.

When moving the second support member 4 from a building floor where it stays now to an upper floor of the building, the second support member 4 is pulled up by the second support member hoister 7 with the movable support portions 12 retracted and, once the second support member 4 has passed the beams of the upper floor of the building, the movable support portions 12 are stretched to engage with the beams of the upper floor of the building. Thus, equipping the second support member 4 with the movable support portions 12 makes it possible to improve the workability of moving the second support member 4 up and down.

The second machine room unit 62 is suspended from the second support member 4 by the second machine room unit hoisters 92*a*, 92*b*, 92*c* (the machine room unit hoisters) installed onto the second support member 4 and configured to be movable in an ascending/descending direction.

The first machine room unit 61 is suspended from the second machine room unit 62 by the first machine room unit hoisters 91*a*, 91*b* installed onto the first machine room unit 61 and configured to be movable in an ascending/descending direction. The first machine room unit hoisters 91*a*, 91*b* pulls up the first machine room unit 61 by 1:X roping through a plurality of pulleys 70 provided onto the first machine room unit 61 and the second machine room unit 62 respectively.

The first machine room unit 61 has movable support portions 130 that stretch toward wall surfaces of the hoistway 100 and retract (in a horizontal direction in FIG. 6) and engage with beams of the building when in a fully stretched state. The first machine room unit 61 also has a winch 15, a main rope 16 wound around the sheave of the winch 15, a car 17 placed on the main rope 16 that is positioned in one side of the winch 15, and a counterweight 18 placed on the main rope 16 that is positioned in the other side of the winch 15. The winch 15 winds up the main rope 16 to move the car 17 up and down.

The second machine room unit 62 has movable support portions 131 that stretch toward wall surfaces of the hoistway 100 and retract (in a horizontal direction in FIG. 6) and engage with beams of the building when in a fully stretched state. Note that machine room supporting components are not limited to the movable support portions 131; for example, as depicted in FIG. 2, the machine room unit may be equipped with a machine room support unit 23 fixed to it.

One end of the main rope 16 is fixed to the first machine room unit 61 by a main rope anchor 160 provided in the first machine room unit 61. The other end of the main rope 16 extends upward from the first machine room unit 61 and is wound around a main rope drum 64 provided in the second machine room unit 62. The main rope drum 64 is provided to extend the main rope 16. The main rope 16 is grasped by a first machine room unit's main rope grasper 65 provided in the first machine room unit 61 and a second machine room unit's main rope grasper 66 provided in the second machine room unit 62 respectively.

When moving the second machine room unit 62 from a building floor where it stays now to an upper floor of the building, the main rope 16 is grasped by the first machine room unit's main rope grasper 65 while the second machine room unit's main rope grasper 66 is released. Then, the rope is pulled out from the first machine room hoisters 91*a*, 91*b* and the second machine room unit 6 is pulled up by the second machine room unit hoisters 92*a*, 92*b*, 92*c* with the movable support portions 131 retracted. Once the second machine room unit 62 has passed the beams of the upper floor of the building, the movable support portions 13 are stretched to engage with the beams of the upper floor of the building. As the rope that suspends the first machine room unit 61 is pulled out from the first machine room hoisters 91*a*, 91*b*, the second machine room unit 62 can be moved to an upper floor of the building. Further, as the main rope 16 is pulled out from the main rope drum 64, the second machine room unit 62 can be moved to an upper floor of the building. At this time, because the main rope 16 is grasped by the first machine room unit's main rope grasper 65, the main rope 16 will not extend downward from the first machine room unit 61. In addition, even during an operation of moving the second machine room unit 62 to an upper floor of the building, the car 17 can be used and, therefore, it is possible to shorten stop time for elevator servicing involving an operation of moving a machine room unit.

Then, when moving the first machine room unit 61 from a building floor where it stays now to an upper floor of the building, the main rope 16 is grasped by the second machine room unit's main rope grasper 66 while the first machine room unit's main rope grasper 65 is released. Then, the first machine room unit 61 is pulled up by the first machine room unit hoisters 91*a*, 91*b* with the movable support portions 130 retracted. Once the first machine room unit 61 has passed the beams of the upper floor of the building, the movable support portions 130 are stretched to engage with the beams of the upper floor of the building. After that, the main rope 16 is grasped by the first machine room unit's main rope grasper 65.

After completion of moving the first machine room unit 61 to an upper floor of the building, the distance of movement of the car 17 in an ascending/descending direction becomes as long as the length of the main rope 16 that has been pulled out from the main rope drum 64.

Example 4 includes the structures of Example 2 and Example 3. However, the working platform 5 does not exist in Example 4.

Because the machine room unit is divided into multiple ones (the first machine room unit 61 and the second machine room unit 62) in Example 4, it is possible to easily perform an operation of extending the main rope 16 in addition to Example 2 and Example 3.

In addition, because the main rope 16 is grasped by the first machine room unit's main rope grasper 65 in Example 4, the main rope 16 will not extend downward from the first machine room unit 61. Additionally, even during an operation of moving the second machine room unit 62 to an upper floor of the building, the car 17 can be used.

Furthermore, because the second machine room unit hoisters 92*a*, 92*b*, 92*c* that hoist the second machine room unit 62 are installed onto the second support member 4 in Example 4, it is possible to reduce the weight of the second machine room unit 62 by leaving the weights of the second machine room unit hoisters 92*a*, 92*b*, 92*c* out of account. In consequence, it is possible to lessen the driving force for the second machine room unit hoisters 92*a*, 92*b*, 92*c* to pull up the second machine room unit 62 and it is possible to prevent an increase in size of the second machine room unit hoisters 92*a*, 92*b*, 92*c*.

[Conclusions]

As described hereinbefore, a construction elevator device relevant to the foregoing Examples 1 through 3 includes a support member (the second support member 4) provided in a hoistway (the hoistway 100), a working platform (the working platform 5) and a machine room unit (the machine room unit 6) placed under the support member, a working platform hoister (the working platform hoister 8) by which the working platform is suspended from the support member so as to be movable in an ascending/descending direction, and machine room unit hoisters (the machine room unit hoisters 9*a*, 9*b*, 9*c*) which are installed onto the support member (the second support member 4) and by which the machine room unit is suspended from the support member so as to be movable in an ascending/descending direction.

At least three machine room unit hoisters are provided and there are at least three suspension points of the machine room unit. When viewed from a virtual horizontal plane over the machine room unit, the distances from the center of gravity (the center G of gravity) of the machine room unit to each of the suspension points are substantially equal and the center of gravity is positioned within a region enclosed by virtual straight lines connecting each of the suspension points. The working platform is placed between the support member and the machine room unit. When viewed from a virtual horizontal plane over the working platform, the respective suspension points of the machine room unit are positioned outside the counter of the working platform.

Thereby, even when the working platform is moved up and down, the working platform can be prevented from interfering with the ropes (suspension ropes) of the machine room unit hoisters and the suspension points and hoisting the machine room unit can be performed without carrying the working platform out of the hoistway. In addition, because load is evenly applied to three suspension points of the machine room unit, it is possible to effectively prevent the machine room unit from tilting and stability of the machine room unit can be maintained. Furthermore, it is possible to hoist the machine room unit while preventing an overload to one of the machine room unit hoisters.

Furthermore, because the machine room unit hoisters that hoist the machine room unit are installed onto the support member, it is possible to reduce the weight of the machine room unit by leaving the weights of the machine room unit hoisters out of account. In consequence, it is possible to lessen the driving force for the machine room unit hoisters to pull up the car, the counterweight, and the machine room unit and it is possible to prevent an increase in size of the machine room unit hoisters.

In addition, the hoistway in which a construction elevator device relevant to the forgoing Examples 2 and 3 is placed is provided with a pair of car's guide rails (the pair of car's guide rails 101*a*, 101*b*) to guide the car (the car 17) in an ascending/descending direction. Moreover, among the at least three suspension points of the machine room unit, at least one suspension point (the suspension points 21*a*, 21*b*) is placed opposite to the center of gravity across a car's virtual straight line (the car's virtual straight line L1) connecting the pair of car's guide rails. Thereby, even if an unbalanced load occurs in the machine room unit, it is possible to prevent an overload from being exerted on the car's guide rails.

In addition, the hoistway in which a construction elevator device relevant to the forgoing Example 3 is placed is provided with a pair of counterweight's guide rails (the pair of counterweight's guide rails 102*a*, 102*b*) to guide the counterweight (the counterweight 18) in an ascending/descending direction. A weight's virtual straight line (the weight's virtual straight line L2) connecting the pair of counterweight's guide rails is substantially parallel with the car's virtual straight line (the car's virtual straight line L1). Moreover, among the at least three suspension points of the machine room unit, a suspension point (the suspension point 21*c*) other than suspension points (the suspension points 21*a*, 21*b*) placed opposite to the center of gravity across the car's virtual straight line is placed opposite to the center of gravity across the weight's virtual straight line. Thereby, even if an unbalanced load occurs in the machine room unit, it is possible to prevent an overload from being exerted on the pair of counterweight's guide rails.

Furthermore, a construction elevator device relevant to the foregoing Example 4 includes a support member (the second support member 4) provided in a hoistway (the hoistway 100), a first machine room unit (the first machine room unit 61) and a second machine room unit (the second machine room unit 62) placed under the support member, second machine room unit hoisters (the second machine room unit hoisters 92*a*, 92*b*, 92*c*) which are installed onto the second support member 4 and by which the second machine room unit is suspended from the support member so as to be movable in an ascending/descending direction, and first machine room unit hoisters (the first machine room unit hoisters 91*a*, 91*b*) by which the first machine room unit is suspended from the second machine room unit so as to be movable in an ascending/descending direction.

Advantageous effects as below can be obtained in Example 4 in addition to Example 2 and Example 3.

Because the machine room unit is divided into multiple ones (the first machine room unit 61 and the second machine room unit 62), it is possible to easily perform an operation of extending the main rope (the main rope 16).

In addition, because the main rope is grasped by a first machine room unit's main rope grasper (the first machine room unit's main rope grasper 65), the main rope will not extend downward from the first machine room unit 61. Additionally, even during an operation of moving the second machine room unit to an upper floor of the building, it is possible to shorten stop time for elevator servicing involving an operation of moving a machine room unit so that the car 17 can be used.

Furthermore, because the second machine room unit hoisters that hoist the second machine room unit are installed onto the second support member, it is possible to reduce the weight of the machine room unit by leaving the weights of the second machine room unit hoisters out of account. In consequence, it is possible to lessen the driving force for the second machine room unit hoisters to pull up the first machine room unit and it is possible to prevent an increase in size of the second machine room unit hoisters.

Examples of the construction elevator device of the present invention including their operational advantages and effects have been described hereinbefore. However, the present invention is not limited to the examples described hereinbefore and various modifications are included therein. By way of example, the foregoing embodiments are those described in detail to explain the present invention to make it easy to understand and the present invention is not necessarily limited to those including all components described. In addition, a subset of the components of an example may be replaced by components of another example and components of another example may be added to the components of an example. In addition, for a subset of the components of each example, other components may be added to the subset or the subset may be removed or replaced by other components.

In the structures described by the foregoing Examples 1 through 4, three machine room unit hoisters are used. Nevertheless, a construction elevator device relevant to the present invention may be configured such that at least four machine room hoisters are used and there may be provided at least four suspension points; e.g., it may be configured such that three suspension points and one auxiliary suspension point are provided.

In addition, in the foregoing Example 2, the suspension points 21*a* and 21*b* are placed opposite to the center G of gravity of the machine room unit 6 across the car's virtual straight line L1 connecting the pair of car's guide rails 101*a*, 101*b*. Nevertheless, in a construction elevator device relevant to the present invention, there may be provided at least one suspension point that is placed opposite to the center G of gravity of the machine room unit 6 across the car's virtual straight line L1.

In addition, in the foregoing Example 3, the suspension point 21*c* is placed opposite to the center G of gravity of the machine room unit 6 across the weight's virtual straight line L2 connecting the pair of counterweight's guide rails 102*a*, 102*b*. Nevertheless, in a construction elevator device relevant to the present invention, there may be at least two suspension points that are placed opposite to the center G of gravity of the machine room unit 6 across the weight's virtual straight line L2.

In addition, in the foregoing Example 3, the suspension points 21*a*, 21*b* are placed opposite to the center G of gravity of the machine room unit 6 across the car's virtual straight line L1 and the suspension point 21*c* is placed opposite to the center G of gravity of the machine room unit 6 across the weight's virtual straight line L2. Nevertheless, a construction elevator device relevant to the present invention may be configured such that at least one suspension point is placed opposite to the center G of gravity of the machine room unit 6 across the weight's virtual straight line L2 and the remaining suspension points are positioned to only fulfill conditions in which they are placed at substantially equal distances from the center G of gravity and outside the contour of the working platform 5.

In addition, although the structure in the foregoing Example 4 is configured such that the first machine room unit 61 is equipped with two first machine room unit hoisters 91*a*, 91*b*, it may be configured such that the first machine room unit is equipped with at least one first machine room unit hoister. Additionally, the machine room supporting components are not limited to the movable support portions 131; for example, as depicted in FIG. 2, the machine room unit may be equipped with a machine room support unit 23 fixed to it.

REFERENCE SIGNS LIST

1, 10 . . . construction elevator device, 3 . . . first support member, 4 . . . second support member, 5 . . . working platform, 6 . . . machine room unit, 7 . . . second support member hoister, 8 . . . working platform hoister, 9*a*, 9*b*, 9*c* . . . machine room unit hoisters, 12, 13, 130, 131 . . . movable support portions, 15 . . . winch, 16 . . . main rope, 17 . . . car, 18 . . . counterweight, 21*a*, 21*b*, 21*c* . . . suspension points, 23 . . . machine room support unit, 31*a*, 31*b*, 32*a*, 32*b* . . . machine room's guide shoes, 61 . . . first machine room unit, 62 . . . second machine room unit, 64 . . . main rope drum, 65 . . . first machine room unit's main rope grasper, 66 . . . second machine room unit's main rope grasper, 70 . . . pulleys, 91*a*, 91*b* . . . first machine room hoisters, 92*a*, 92*b*, 92*c* . . . second machine room unit hoisters, 100 . . . hoistway, 101*a*, 101*b* . . . car's guide rails, 102*a*, 102*b* . . . weight's guide rails, 160 . . . main rope anchor

The invention claimed is:

1. A construction elevator device comprising:

a support member provided in a hoistway;

a machine room unit placed under the support member; and machine room unit hoisters by which the machine room unit is suspended from the support member so as to be movable in an ascending/descending direction, wherein the machine room unit hoisters being at least three in number are provided, supported by the support member, and there are at least three suspension points of the machine room unit; and when viewed from a virtual horizontal plane over the machine room unit, distances from a center of gravity of the machine room unit to each of the suspension points are substantially equal and the center of gravity is positioned within a region enclosed by virtual straight lines connecting each of the suspension points, wherein the machine room unit includes a first machine room unit and a second machine room unit;

the first machine room unit includes a winch that winds up a main rope to move a car up and down;

the second machine room unit includes a main rope drum to extend the main rope; and the machine room unit hoisters pull up the second machine room unit.

2. The construction elevator device according to claim 1, further comprising:

a working platform placed under the support member provided in the hoistway; and a working platform hoister by which the working platform is suspended from the support member so as to be movable in an ascending/descending direction, wherein the working platform is placed between the support member and the machine room unit; and when viewed from a virtual horizontal plane over the working platform, the respective suspension points of the machine room unit are positioned outside a contour of the working platform.

3. The construction elevator device according to claim 1, wherein the hoistway is provided with a pair of car's guide rails to guide a car and the machine room unit in an ascending/descending direction; and among the at least three suspension points of the machine room unit, at least one suspension point is placed opposite to the center of gravity across a car's virtual straight line connecting the pair of car's guide rails.

4. The construction elevator device according to claim 3, wherein the hoistway is provided with a pair of counterweight's guide rails to guide a counterweight and the machine room unit in an ascending/descending direction;

a weight's virtual straight line connecting the pair of counterweight's guide rails is substantially parallel with the car's virtual straight line; and among the at least three suspension points of the machine room unit, a suspension point other than suspension points placed opposite to the center of gravity across the car's virtual straight line is placed opposite to the center of gravity across the weight's virtual straight line.

5. The construction elevator device according to claim 1, wherein the first machine room unit includes first machine room hoisters to pull up the first machine room unit upward; and the machine room unit hoisters that hoist the second machine room unit are second machine room unit hoisters.

6. The construction elevator device according to claim 5, wherein the first machine room unit includes a first machine room unit's main rope grasper to grasp the main rope;

the second machine room unit includes a second machine room unit's main rope grasper to grasp the main rope;

when pulling up the second machine room unit by the second machine room unit hoisters, the main rope is grasped by the first machine room unit's main rope grasper while the second machine room unit's main rope grasper is released; and when pulling up the first machine room unit by the first machine room unit hoisters, the main rope is grasped by the second machine room unit's main rope grasper while the first machine room unit's main rope grasper is released.

7. The construction elevator device according to claim 1, wherein the support member includes movable support portions that stretch toward wall surfaces of the hoistway and retract.

* * * * *